United States Patent [19]

Bloom

[11] Patent Number: 5,282,916
[45] Date of Patent: Feb. 1, 1994

[54] METHOD AND APPARATUS FOR MAKING DRIP IRRIGATION DEVICES

[75] Inventor: Shlomo Bloom, Ramat Gan, Israel

[73] Assignee: Hydromatic Ltd., Migdal Haemek, Israel

[21] Appl. No.: 971,037

[22] Filed: Nov. 3, 1992

[30] Foreign Application Priority Data

Nov. 22, 1991 [IL] Israel ..................... 100126

[51] Int. Cl.⁵ ............................................. B29C 47/02
[52] U.S. Cl. .................... 156/244.13; 156/244.14; 156/293; 156/294; 156/538; 239/542; 239/547
[58] Field of Search .............. 156/244.13, 244.14, 156/293, 294, 538; 239/542, 547

[56] References Cited

U.S. PATENT DOCUMENTS 3,905,749  9/1975  Suzuki et al. ............ 425/113
4,191,518  3/1980  Kojimoto et al. .......... 425/326.1
5,022,940  6/1991  Mehoudar ................ 239/542

FOREIGN PATENT DOCUMENTS 0344605  12/1989  European Pat. Off. .
0480632   4/1992  European Pat. Off. .
9205689   4/1992  PCT Int'l Appl. .

*Primary Examiner*—Caleb Weston
*Attorney, Agent, or Firm*—Benjamin J. Barish

[57] ABSTRACT

A method and apparatus for making a drip irrigation device by continuously extruding a tube and simultaneously feeding a plurality of dripper units in succession within the tube as it is extruded. Each dripper unit is arrested as it arrives at a first location which is a short distance downstream of the extrusion head where the extruded tube is still tacky, and is then moved transversely to bring it into light contact with the tacky surface of the extruded tube to cause the dripper unit to lightly adhere to the tube and to begin to move axially with it. A short distance downstream of the first location where the dripper unit has attained the same axial velocity as the extruded tube, the dripper unit is pressed into firm bonding contact with the tacky inner surface of the extruded tube.

17 Claims, 3 Drawing Sheets

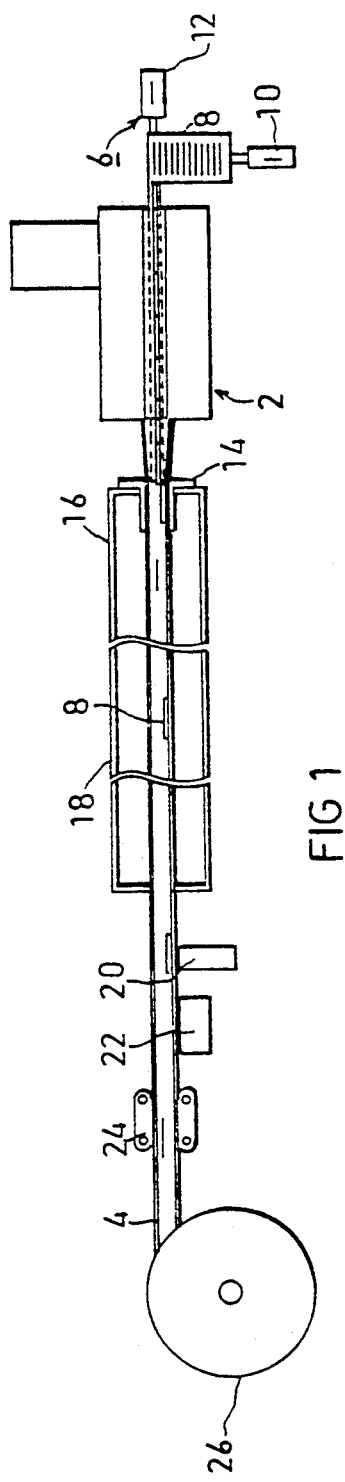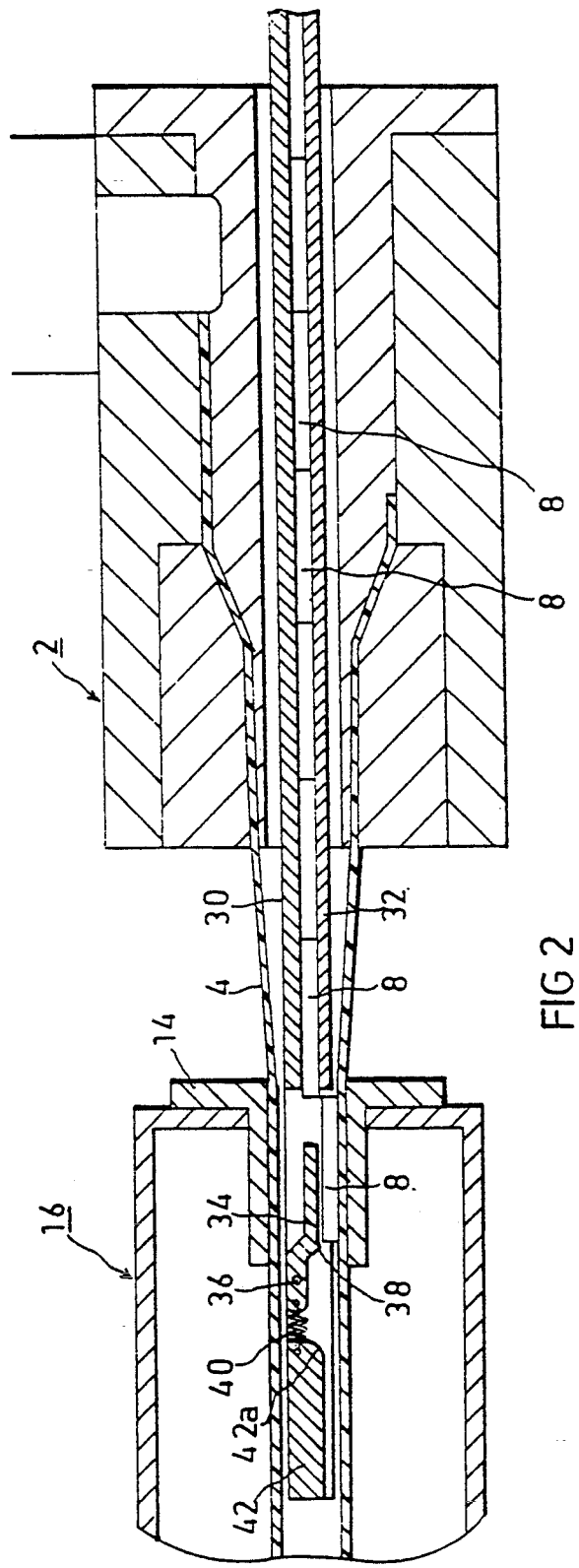
FIG 1
FIG 2

METHOD AND APPARATUS FOR MAKING DRIP IRRIGATION DEVICES

FIELD AND BACKGROUND OF THE INVENTION

The present invention relates to a method and apparatus for making drip irrigation devices, and particularly to such devices including a tube having a plurality of dripper units bonded to a surface of the tube with each unit extending for only a part of the circumference of the tube.

One of the serious problems in making drip irrigation devices of the foregoing type is the bonding of the dripper units to the tube at the time of extrusion of the tube. The dripper units are generally bonded by pressing them against the tube. Ideally, the velocity of the dripper units should be zero relative to that of the tube at the instant of bonding to avoid creating stresses in the bond and/or weakened portions in the tube. This is presently accomplished by accelerating each dripper unit in the axial direction until its velocity reaches that of the tube being extruded, and then displacing the dripper units transversely into contact with the tube when both the tube and the dripper units are travelling at exactly the same linear velocity. However, as a practical matter it is difficult to control the acceleration and transverse displacement of the dripper units to assure that the dripper units will be brought into contact with the tube at the precise instant that both are travelling at the same linear velocity.

OBJECTS AND BRIEF SUMMARY OF THE INVENTION

An object of the present invention is to provide a novel method, and also novel apparatus, for making drip irrigation devices having advantages in the above respects.

According to the present invention, there is provided a method of making a drip irrigation device including a tube formed with a plurality of apertures and dripper units bonded to a surface of the tube in alignment with the apertures, with each unit extending for only a part of the circumference of the tube, comprising: continuously extruding the tube from an extrusion head; feeding a plurality of dripper units in succession to move axially with respect to the tube during the extrusion thereof; at a first location, which is a short distance downstream of the extrusion head where the extruded tube is still tacky, arresting the axial movement of each dripper unit as it arrives to the first location and moving it transversely to bring it into light contact with the tacky surface of the extruded tube, to thereby cause the dripper unit to lightly adhere to the extruded tube and to begin to move axially with the extruded tube; and at a second location, which is a short distance downstream of the first location where the dripper unit has attained the same axial velocity as the extruded tube, pressing the dripper unit into firm bonding contact with the tacky inner surface of the extruded tube.

In the described preferred embodiment of the invention, the dripper units are bonded to the inner surface of the extruded tube, each of the dripper units including an inlet communicating with the interior of the tube and an outlet, the apertures being formed by punching holes in the tube in alignment with the outlets of the dripper units.

According to further features in the described preferred embodiment, the plurality of dripper units are fed in serial abuting relation to each other through the interior of the extruded tube. Each dripper unit, upon reaching the first location, is arrested from axial movement and is moved transversely into contact with the tacky inner surface of the extruded tube, by a movable deflector. The deflector is movable from a normal first position, wherein a shoulder thereon is in the path of the dripper unit so as to be engaged by the leading edge thereof and to be arrested thereby, the deflector being movable by the engagement with the dripper unit to a second unit to deflect such dripper unit transversely into contact with the tacky inner surface of the extruded tube. Instead of by a deflector, the inserts may also be moved transversely by gravity and/or fluid pressure (positive or negative).

According to still further features in the described preferred embodiment, each of the dripper units is pressed into firm bonding contact with the inner surface of the extruded tube by a fixed pressure plate at the second location having a leading edge engageable with the dripper unit lightly adhering to the tacky inner surface of the extruded tube.

As will be more particularly described below, the foregoing method of making drip irrigation devices better assures that the actual bonding of the dripper units to the extruded tube will be done precisely when the dripper units are travelling at the same axial velocity as the extruded tube. Thus, the invention lessens the danger of weakening the tube and/or creating stresses in the bonds between the dripper units and the tube, which are liable to be caused when there is a differential axial movement between the dripper units and the tube at the instant the dripper units are pressed into bonding contact with the extruded tube.

The invention also provides apparatus for making drip irrigation devices in accordance with the above method.

Further features and advantages of the invention will be apparent from the description below.

BRIEF DESCRIPTION OF THE DRAWINGS

The invention is herein described, by way of example only, with reference to the accompanying drawings, wherein:

FIG. 1 schematically illustrates one form of apparatus for making drip irrigation devices in accordance with the present invention;

FIG. 2 is an enlarged view, in longitudinal section, of a portion of the apparatus of FIG. 1;

DESCRIPTION OF PREFERRED EMBODIMENTS

The apparatus illustrated in FIG. 1 comprises an extruder including an extrusion head 2 for continuously extruding a tube 4, and a feeder 6 for continuously feeding dripper units 8 through the extrusion head 2 and into the interior of the tube 4 at the time the tube is extruded. The extruded tube 4 is circular in section, but the dripper units 8 extend for only a part of the circumference of the tube. Accordingly, to bond the dripper units to the inner face of the tube 4, the dripper units must be displaced transversely with respect to the tube.

Figure 3A:
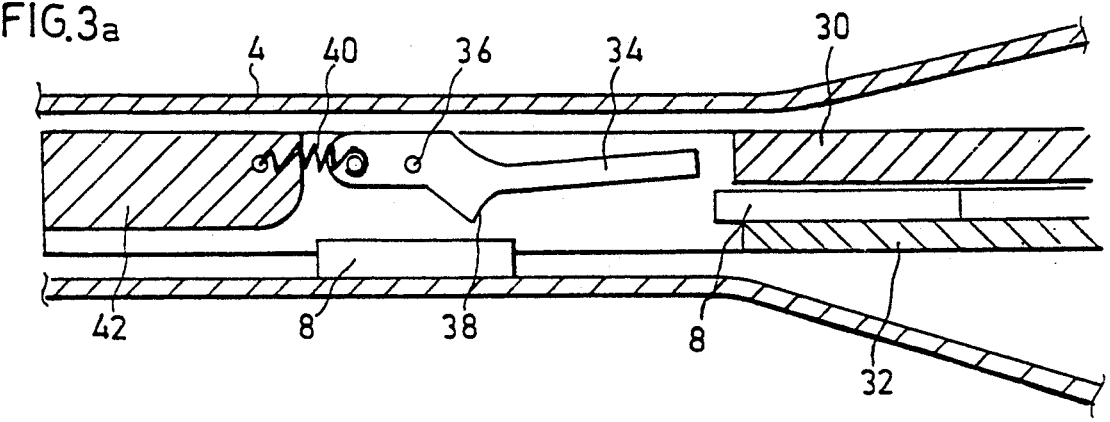
FIGS. 3a, 3b and 3c illustrate different stages in the operation of the apparatus.
Figure 3B:
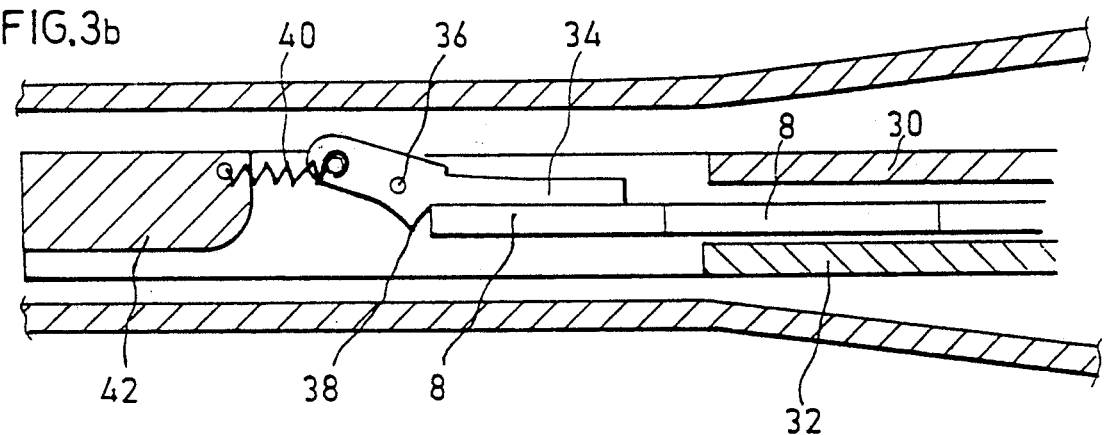
Figure 3C:
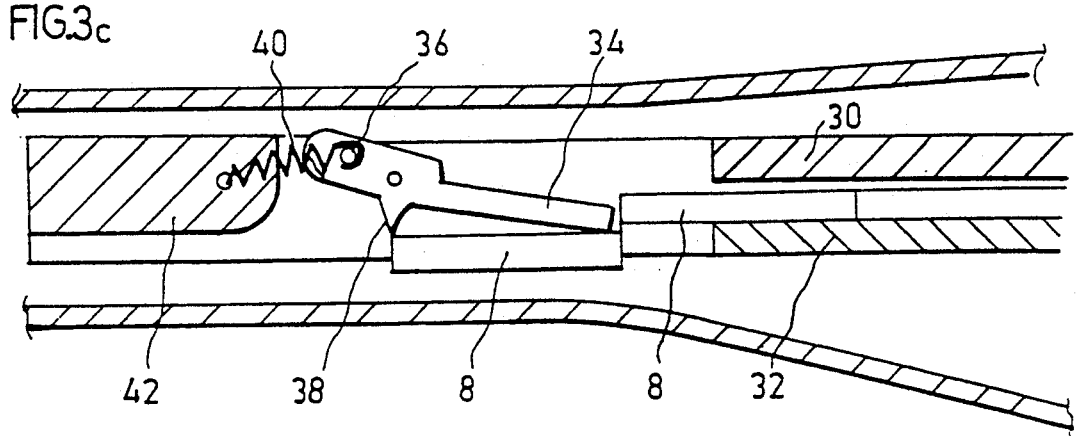
Figure 3:
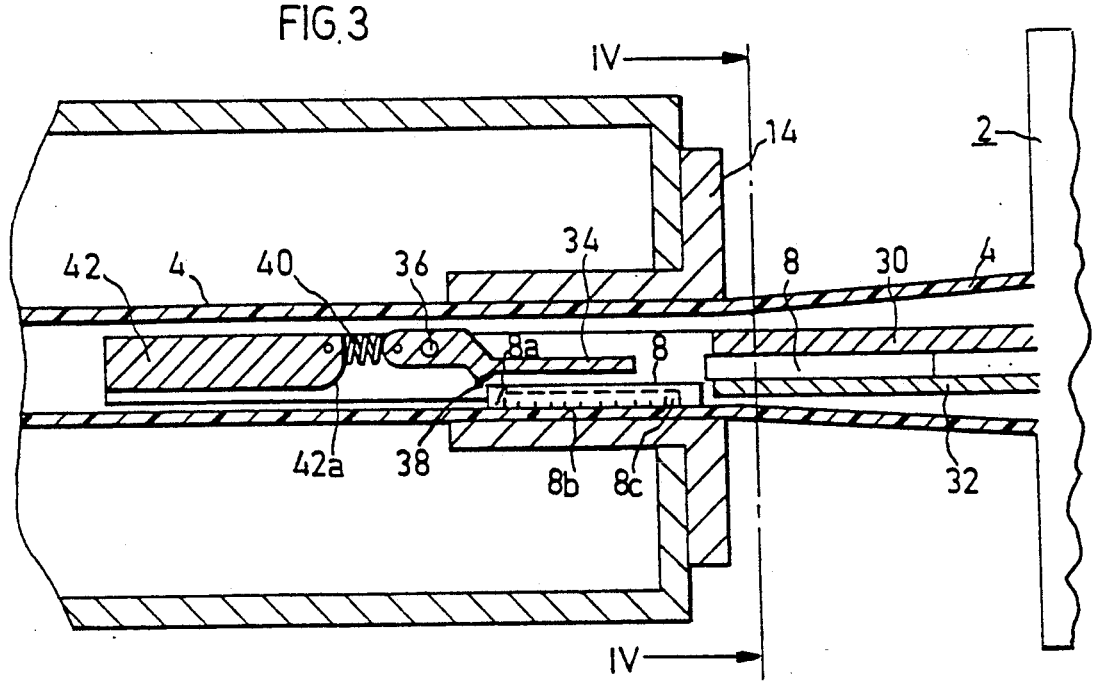
FIG. 3 is a fragmentary, enlarged view of a part of the apparatus shown in FIG. 2.
Figure 4:
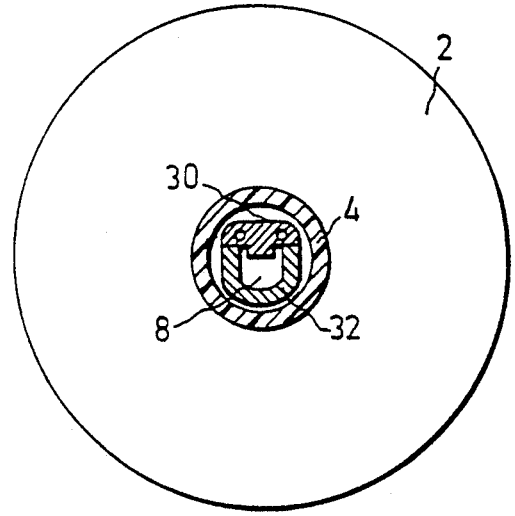
FIG. 4 is a transverse sectional view along line IV——IV of FIG. 3.

FIGS. 2-4 more particularly describe the manner in which the dripper units 8 are fed into the interior of the tube 4, at the time of the extrusion of the tube, and are displaced transversely of the tube in order to bond the dripper units to the inner face of the tube without, or with a minimum of, stresses in the bonds and weakening of the tube.

The feeder 6 includes a stacker receptacle 10 containing a stack of the dripper units 8, and a reciprocatory drive 12 which feeds the uppermost dripper unit 8 of the stack into the extruder head 2. A calibrater head 14 is located downstream of the extruder head 2 and reduces the diameter of the extruded tube 4 exiting from the extruder head. The calibrater head 14 is located at the entrance of a cooling bath filled with water. Head 14 is divided into a bonding zone 16 where the dripper units 8 are bonded to the interior of the extruded tube 4 within the calibrator head 14, and one or more cooling zones 18 which cool the extruded tube and the dripper units bonded thereto. The illustrated apparatus further includes: a punch unit 20 which punches holes in the extruded tube in alignment with the outlet openings of the dripper units 8; an inspecting unit 22; a drawing unit 24, which draws the extruded tube 4 through the extrusion head and the other units downstream thereof to the drawing unit; and a take-up reel 26 on which the extruded tube is wound.

The dripper units 8 may be of plastic material bondable by pressure-welding to the inner surface of the extruded tube 4, which may also be of plastic material. Each dripper unit 8 is provided with an inlet opening 8a (FIG. 3) communicating with the interior of the extruded tube 4, a flow-reducing pathway 8b (e.g., a labyrinth), and an outlet opening 8c with which the hole produced by the punch 20 is aligned. The flow of the water from the interior of the tube is thus reduced by the labyrinth 8b and flows at a low rate outwardly of the tube through outlet opening 8c of the dripper units 8 and the holes punched through the tube in alignment with those openings.

The foregoing elements of the drip irrigation device, and of the apparatus for making them as illustrated in FIG. 1, are well known except for the portion of the extruder head 2 and the bonding zone 16 shown in FIG. 2, and in more detail in FIGS. 3 and 4, and therefore the remainder of the description will be directed to FIGS. 2-4.

As shown in FIGS. 2-4, the extruder head 2 includes an upper track 30 and a lower track 32 for guiding the movement of the dripper units 8 through the extruder head to the calibrating head 14. The dripper units 8 are fed in serial-abutting contact by the feeding means 6 at one end of the extruder. They are guided to the calibrator head 14 by the upper and lower guiding tracks 30, 32, which thereby prevent the dripper units from contacting the inner tacky surface of the extruded tube 4 until the end of the guiding tracks at the calibrator head 14.

The bonding unit 16 includes an arresting and deflector member 34 which acts to arrest the axial movement of the dripper unit 8 exiting from between the guiding tracks 30, 32. Thus, deflector member 34 is pivotally mounted to the bonding zone 16 by pivot pin 36. One end of deflector member 34 is formed with a shoulder 38 (FIG. 3) depending from its lower surface at one side of pivot pin 36. A spring 40 engageable with the opposite end of deflector member 34 urges it to raised position with the shoulder 38 raised into alignment with the dripper unit 8 exiting from between the guiding tracks 30, 32. The other end of spring 40 is fixed to a pressure applicator 42 having a rounded leading surface 42a.

The illustrated apparatus, particularly the bonding unit 16, operates as follows:

The dripper units 8 are fed by the feeding means 6 in serial abutting relation through the interior of the extruder head 2 between the upper track 30 and the lower track 32 extending through the extruder head and terminating at the calibrator head 14, as shown in FIG. 2.

Deflector member 34, particularly its depending shoulder 38, is located a short distance downstream of the extruder head 2 such that the extruded tube 4 exiting from the head is still tacky. Spring 40 pivots deflection member 34 to bring its shoulder 38 into alignment with the dripper unit 8 exiting from the guiding tracks 30, 32 (FIG. 3a). As soon as shoulder 38 is engaged by the leading edge of the dripper unit, the dripper unit pivots the deflector member 34 clockwise (FIG. 3b) to move the dripper unit out of contact with the preceding one (FIG. 3c) into contact with the tacky inner surface of the extruded tube 4 (FIG. 3a). The deflector member merely brings the dripper unit into light contact with the tacky inner surface of the extruded tube 4, to cause it to lightly adhere to the tacky inner surface of the tube and to begin to move axially with the tube.

Pressure applicator 42 is located a short distance downstream of deflector member 34 such that the rounded leading edge 42a of the applicator member 42 engages the leading edge of the dripper unit 8 lightly adhering to the extruded tube 4 after the dripper unit has attained the axial velocity of the extruder tube by virtue of the light adhesion of the dripper unit to it. Thus, the applicator member 42 presses the dripper unit 8 into firm bonding contact with the inner tacky surface of the extruded tube 8 when there is no (or little) relative movement between the dripper unit and the extruded tube, thereby preventing the creation of stress in the bond between the dripper unit and the extruded tube, and also preventing weakening of the extruded tube.

The extruded tube 4, with the dripper units 8 so bonded to its inner surface, then proceeds through the cooling unit 18, the punch unit 20 which punches holes in the tube 4 in alignment with the outlets of the dripper units, the inspecting unit 22, the drawing unit 24, and is finally wound on the take-up reel 26.

Figure 5:
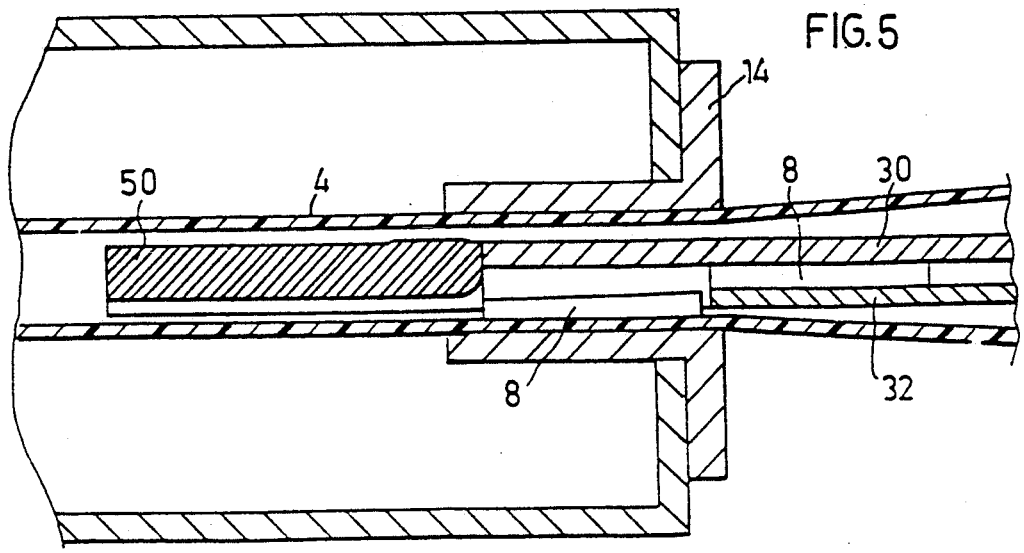
FIG. 5 is a view similar to that of FIG. 3 but illustrating a variation.

FIG. 5 illustrates a variation wherein the pivotal deflecting member 34 is omitted, and instead the pressure applicator, shown at 50, is extended to arrest the axial movement of the dripper unit exiting from the guiding tracks 30, 32, so that the dripper unit drops by gravity into light contact with the tacky inner surface of the tube. Another variation would be to include either a negative pressure or a positive pressure together with, or instead of, gravity for moving the insert in the radial direction into light contact with the inner tacky surface of the tube before the pressure applicator presses it into firm contact with the tube.

While the invention has been described with respect to several preferred embodiments, it will be appreciated that many other variations, modifications and applications of the invention may be made.

What is claimed is:

1. A method of making a drip irrigation device including a tube formed with a plurality of apertures and dripper units bonded to a surface of the tube in alignment with said apertures, with each unit extending for only a part of the circumference of the tube, comprising:

continuously extruding the tube from an extrusion head;

feeding a plurality of dripper units in succession to move axially with respect to the tube during the extrusion thereof;

at a first location, which is a short distance downstream of the extrusion head where the extruded tube is still tacky, arresting the axial movement of each dripper unit as it arrives to said first location and moving it transversely to bring it into light contact with said tacky surface of the extruded tube, to thereby cause the dripper unit to lightly adhere to the extruded tube and to begin to move axially with the extruded tube; and at a second location, which is a short distance downstream of the first location, where the dripper unit has attained the same axial velocity as the extruded tube, pressing the dripper unit into firm bonding contact with said tacky inner surface of the extruded tube.

2. The method according to claim 1, wherein said surface of the extruded tube is its inner surface, each of said dripper units including an inlet communicating with the interior of the tube and an outlet, said apertures being formed by punching holes in said extruded tube in alignment with the outlets of the dripper units.

3. The method according to claim 2, wherein said plurality of dripper units are fed in serial abuting relation to each other through the interior of the extruded tube, each dripper unit, upon reaching said first location, being arrested from axial movement and being moved transversely into contact with the tacky inner surface of the extruded tube.

4. The method according to claim 3, wherein each of said dripper units is arrested from axial movement and is moved transversely into contact with the tacky inner surface of the extruded tube by a deflector movable from a normal first position, wherein a shoulder thereon is in the path of the dripper unit so as to be engaged by the leading edge thereof and to be arrested thereby, said deflector being movable by said engagement with the dripper unit to a second position to deflect such dripper unit transversely into contact with the tacky inner surface of the extruded tube.

5. The method according to claim 4, wherein said deflector is pivotally mounted and is spring urged to said first position.

6. The method according to claim 3, wherein each of said dripper units is moved by gravity, and/or by negative or positive pressure, transversely into contact with the tacky inner surface of the extruded tube.

7. The method according to claim 3, wherein each of said dripper units is pressed into firm bonding contact with the inner surface of the extruded tube by a fixed pressure plate at said second location having a leading edge engageable with the dripper unit lightly adhering to the tacky inner surface of the extruded tube.

8. The method according to claim 3, wherein said extruded tube is reduced in diameter from its end exiting from the extrusion head to said first location.

9. Apparatus for making a drip irrigation device including a tube formed with a plurality of apertures and dripper units bonded to a surface thereof, with each unit extending for only a part of the circumference of the tube, comprising:

an extruder including an extrusion head for continuously extruding the tube;

feeding means for feeding a plurality of dripper units in succession to move axially of the tube during the extrusion of the tube;

arresting means at a first location which is a short distance downstream of the extruder head, where the extruded tube is still tacky, for arresting the axial movement of each dripper unit as it arrives to said first location, and for moving it transversely to bring it into light contact with said tacky surface of the extruded tube, to thereby cause the dripper unit to lightly adhere to the extruded tube and to begin to move axially with the extruded tube; and a pressure applicator at a second location, which is a short distance downstream of said first location where the dripper unit has attained the same axial velocity as the extruded tube, for pressing the dripper unit into firm bonding contact with the tacky surface of the extruded tube.

10. The apparatus according to claim 9, wherein said feeding means feeds the dripper units interiorly of the extruded tube, each of said dripper units including an inlet communicating with the interior of the extruded tube and an outlet, said apparatus further including punching means for punching holes in the extruded tube in alignment with the outlets of the dripper units for producing said apertures.

11. The apparatus according to claim 10, wherein said feeding means feeds said plurality of dripper units in serial abutting relation through the interior of the extruded tube, and includes guiding means extending to and terminating at, said first location for guiding the so-fed dripper units to said first location.

12. The apparatus according to claim 11, wherein said arresting means comprises a deflector having a shoulder formed therein, said deflector being movable from a first position wherein its shoulder is in the path of the dripper units so as to be engaged by the leading edge of the dripper unit arriving at said first location and to be arrested from further axial movement with respect to the extruded tube; said deflector being movable by said engagement with the dripper unit to a second position to deflect the dripper unit transversely into light contact with the tacky inner surface of the extruded tube.

13. The apparatus according to claim 12, wherein said deflector is pivotally mounted and is spring-urged to said first position.

14. The apparatus according to claim 13, wherein said pressure applicator includes a fixed pressure plate at said second location having a curved leading edge first engageable with the dripper unit as it arrives at said second location.

15. The apparatus according to claim 14, wherein said spring is interposed between the pressure applicator and the end of the deflector facing the pressure applicator; said shoulder depending from the lower surface of the deflector at the opposite side of said pivot.

16. The apparatus according to claim 15, wherein said first location includes a calibrator unit for reducing the diameter of the extruded tube.

17. The apparatus according to claim 9.., wherein said arresting means permits the dripper units to be moved by gravity, and/or by negative or positive pressure, transversely into contact with the tacky inner surface of the extruded tube.

* * * * *